(12) United States Patent
Larsen

(10) Patent No.: US 6,193,044 B1
(45) Date of Patent: Feb. 27, 2001

(54) SWIVELABLE ROLLER CONVEYOR APPARATUS

(76) Inventor: Richard Larsen, 100 Kingsland Ct., Vacaville, CA (US) 95687

( * ) Notice: Subject to any disclaimer, the term of this patent is extended or adjusted under 35 U.S.C. 154(b) by 0 days.

(21) Appl. No.: 09/368,692

(22) Filed: Aug. 5, 1999

(51) Int. Cl.[7] .................................................. B65G 13/00
(52) U.S. Cl. ........................................................ 193/35 R
(58) Field of Search ...................... 193/35 R; 198/861.6, 198/587

(56) References Cited

U.S. PATENT DOCUMENTS

| | | | |
|---|---|---|---|
| 2,075,833 | * | 4/1937 | Smith ................................ 226/129 X |
| 2,471,140 | * | 5/1949 | Breth ....................................... 193/35 |
| 2,905,311 | * | 9/1959 | Marchetti ......................... 198/112 X |
| 3,020,993 | * | 2/1962 | Heinrich et al. .................... 193/38 X |
| 3,583,588 | * | 6/1971 | Royal ................................. 214/173 X |
| 3,787,039 | * | 1/1974 | Zeichman ............................ 269/13 X |
| 4,029,222 | * | 6/1977 | Yano et al. ......................... 214/41 X |
| 4,135,620 | * | 1/1979 | Harcuba et al. .................. 198/836 X |
| 4,213,734 | * | 7/1980 | Holderness ........................ 414/133 X |
| 4,715,488 | * | 12/1987 | Hewitt et al. ....................... 193/35 R |
| 5,337,875 | * | 8/1994 | Lee ..................................... 193/35 R |
| 5,993,146 | * | 11/1999 | Hallgren ............................ 414/792.2 |

* cited by examiner

Primary Examiner—Christopher P. Ellis
Assistant Examiner—Kenneth W. Bower

(57) ABSTRACT

A swivelable roller conveyor apparatus for easily and conveniently moving articles from one point to another point and allowing the user to easily move around the conveyor apparatus. The swivelable roller conveyor apparatus includes a support base having an upright tubular member, a torsion spring securely mounted about the tubular member near a top thereof, an elongate support member, a rack mounted upon the elongate support member and having a plurality of rollers spaced apart and laterally aligned in a single plane, a bearing securely mounted about the elongate support member, a bushing securely mounted about the elongate support member near a bottom thereof, and a flange member conventionally attached to the elongate support member which is pivotally extended in through a top of the tubular member.

12 Claims, 4 Drawing Sheets

SWIVELABLE ROLLER CONVEYOR APPARATUS

BACKGROUND OF THE INVENTION

1. Field of the Invention

The present invention relates to a swivelable article mover and more particularly pertains to a new swivelable roller conveyor apparatus for easily and conveniently moving articles from one point to another point and allowing the user to easily move around the conveyor apparatus.

2. Description of the Prior Art

The use of a swivelable article mover is known in the prior art. More specifically, a swivelable article mover heretofore devised and utilized are known to consist basically of familiar, expected and obvious structural configurations, notwithstanding the myriad of designs encompassed by the crowded prior art which have been developed for the fufillment of countless objectives and requirements.

Known prior art includes U.S. Pat. No. 5,346,051; U.S. Pat. No. 5,188,210; U.S. Pat. No. 4,832,170; U.S. Pat. No. 5,172,804; U.S. Pat. No. 2,425,860; and U.S. Pat. No. D126,195.

While these devices fulfill their respective, particular objectives and requirements, the aforementioned patents do not disclose a new swivelable roller conveyor apparatus. The inventive device includes a support base having an upright tubular member, a torsion spring securely mounted about the tubular member near a top thereof, an elongate support member, a rack mounted upon the elongate support member and having a plurality of rollers spaced apart and laterally aligned in a single plane, a bearing securely mounted about the elongate support member, a bushing securely mounted about the elongate support member near a bottom thereof, and a flange member conventionally attached to the elongate support member which is pivotally extended in through a top of the tubular member.

In these respects, the swivelable roller conveyor apparatus according to the present invention substantially departs from the conventional concepts and designs of the prior art, and in so doing provides an apparatus primarily developed for the purpose of easily and conveniently moving articles from one point to another point and allowing the user to easily move around the conveyor apparatus.

SUMMARY OF THE INVENTION

In view of the foregoing disadvantages inherent in the known types of a swivelable article mover now present in the prior art, the present invention provides a new swivelable roller conveyor apparatus construction wherein the same can be utilized for easily and conveniently moving articles from one point to another point and allowing the user to easily move around the conveyor apparatus.

The general purpose of the present invention, which will be described subsequently in greater detail, is to provide a new swivelable roller conveyor apparatus which has many of the advantages of the swivelable article mover mentioned heretofore and many novel features that result in a new swivelable roller conveyor apparatus which is not anticipated, rendered obvious, suggested, or even implied by any of the prior art a swivelable article mover, either alone or in any combination thereof.

To attain this, the present invention generally comprises a support base having an upright tubular member, a torsion spring securely mounted about the tubular member near a top thereof, an elongate support member, a rack mounted upon the elongate support member and having a plurality of rollers spaced apart and laterally aligned in a single plane, a bearing securely mounted about the elongate support member, a bushing securely mounted about the elongate support member near a bottom thereof, and a flange member conventionally attached to the elongate support member which is swivelly extended in through a top of the tubular member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new swivelable roller conveyor apparatus which has many of the advantages of a swivelable article mover mentioned heretofore and many novel features that result in a new swivelable roller conveyor apparatus which is not anticipated, rendered obvious, suggested, or even implied by any of the prior art a swivelable article mover, either alone or in any combination thereof.

It is another object of the present invention to provide a new swivelable roller conveyor apparatus which may be easily and efficiently manufactured and marketed.

It is a further object of the present invention to provide a new swivelable roller conveyor apparatus which is of a durable and reliable construction.

An even further object of the present invention is to provide a new swivelable roller conveyor apparatus which is susceptible of a low cost of manufacture with regard to both materials and labor, and which accordingly is then susceptible of low prices of sale to the consuming public, thereby making such swivelable roller conveyor apparatus economically available to the buying public.

Still yet another object of the present invention is to provide a new swivelable roller conveyor apparatus which provides in the apparatuses and methods of the prior art some of the advantages thereof, while simultaneously overcoming some of the disadvantages normally associated therewith.

Still another object of the present invention is to provide a new swivelable roller conveyor apparatus for easily and conveniently moving articles from one point to another point and allowing the user to easily move around the conveyor apparatus.

Yet another object of the present invention is to provide a new swivelable roller conveyor apparatus which includes a support base having an upright tubular member, a torsion spring securely mounted about the tubular member near a top thereof, an elongate support member, a rack mounted upon the elongate support member and having a plurality of rollers spaced apart and laterally aligned in a single plane, a bearing securely mounted about the elongate support member, a bushing securely mounted about the elongate support member near a bottom thereof, and a flange member conventionally attached to the elongate support member which is pivotally extended in through a top of the tubular member.

Still yet another object of the present invention is to provide a new swivelable roller conveyor apparatus that allows the user to pivot the conveyor apparatus out of the way when needed.

Even still another object of the present invention is to provide a new swivelable roller conveyor apparatus that is easy and convenience to set up and substantially prevents injuries to the user's back in particular.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
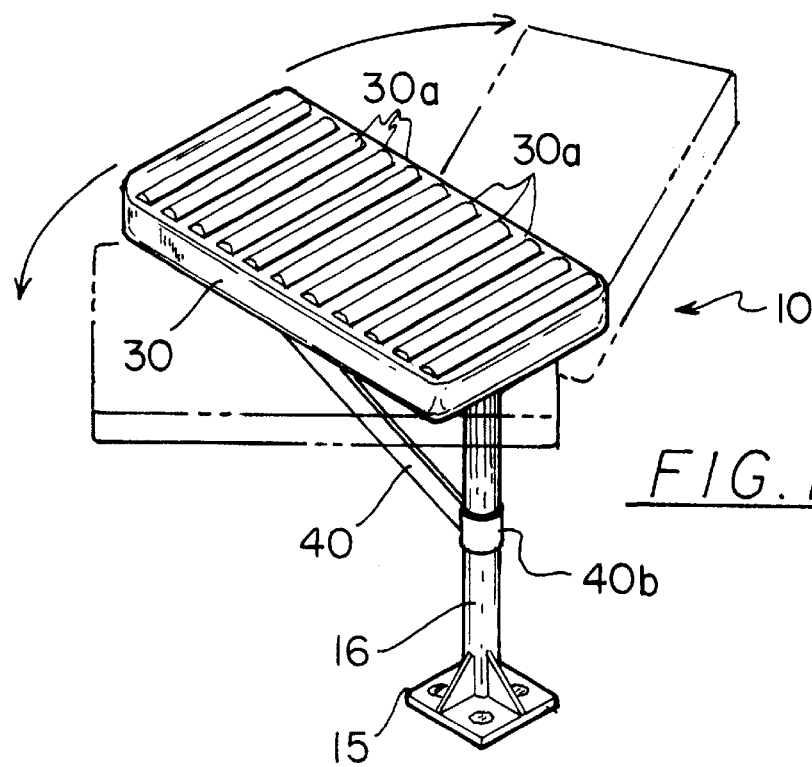
FIG. 1 is a perspective view of a new swivelable roller conveyor apparatus according to the present invention.
Figure 2:
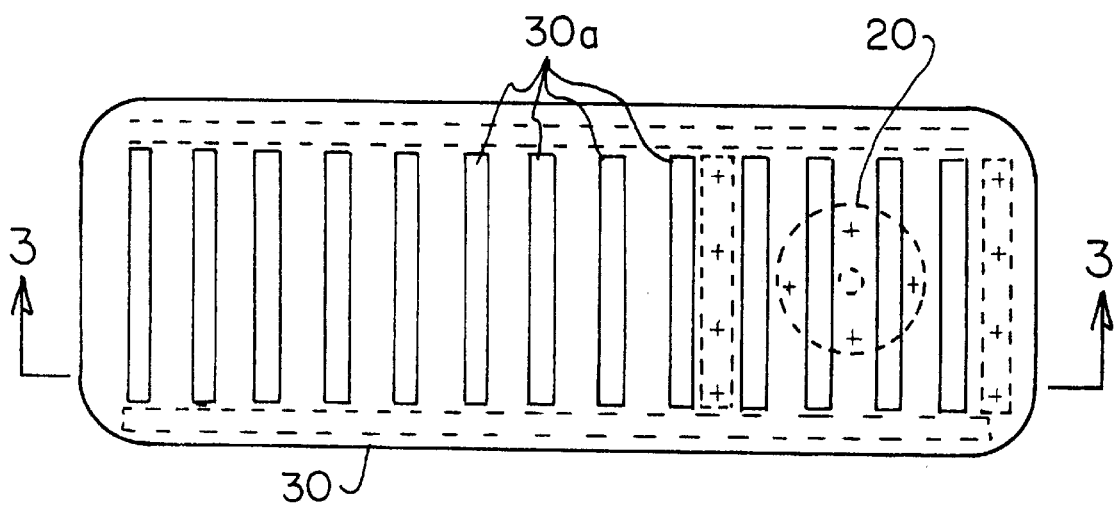
FIG. 2 is a top plan view of the present invention.
Figure 3:
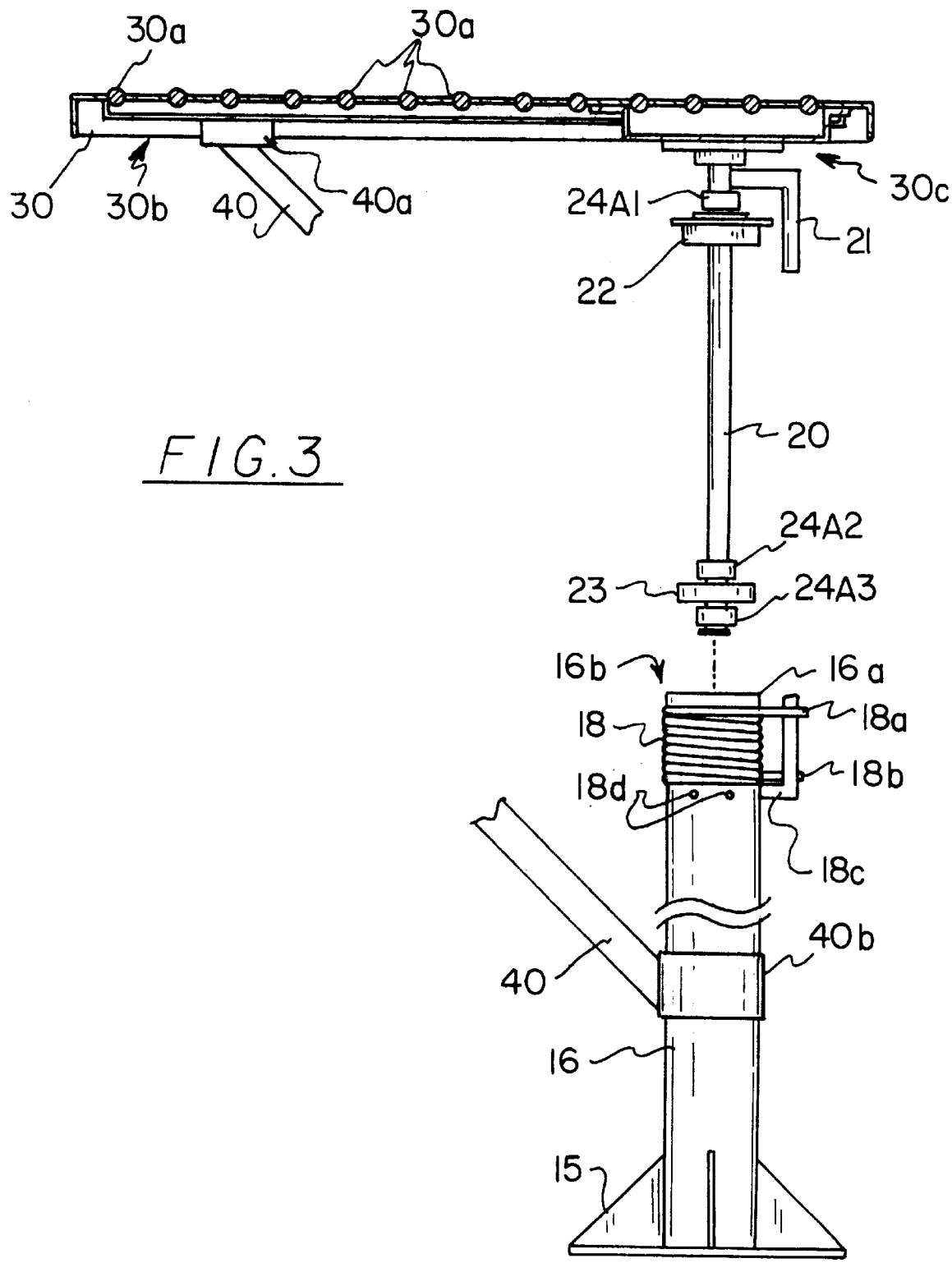
FIG. 3 is an exploded side elevational view of the present invention.
Figures 4, 5:
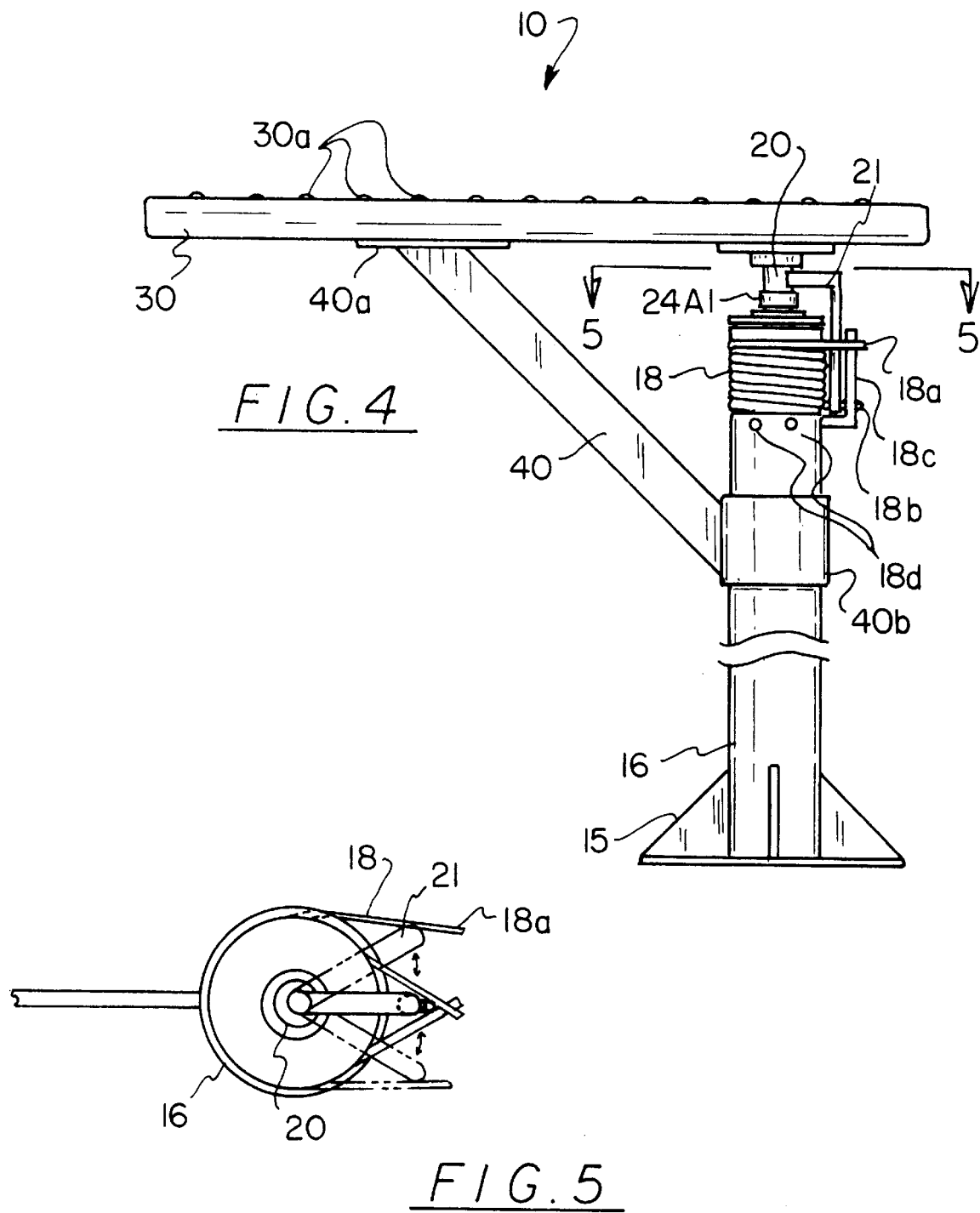
FIG. 4 is a side elevational view of the present invention.
FIG. 5 is a detailed top plan view of the tubular member and torsion spring of the present invention.
Figure 6:
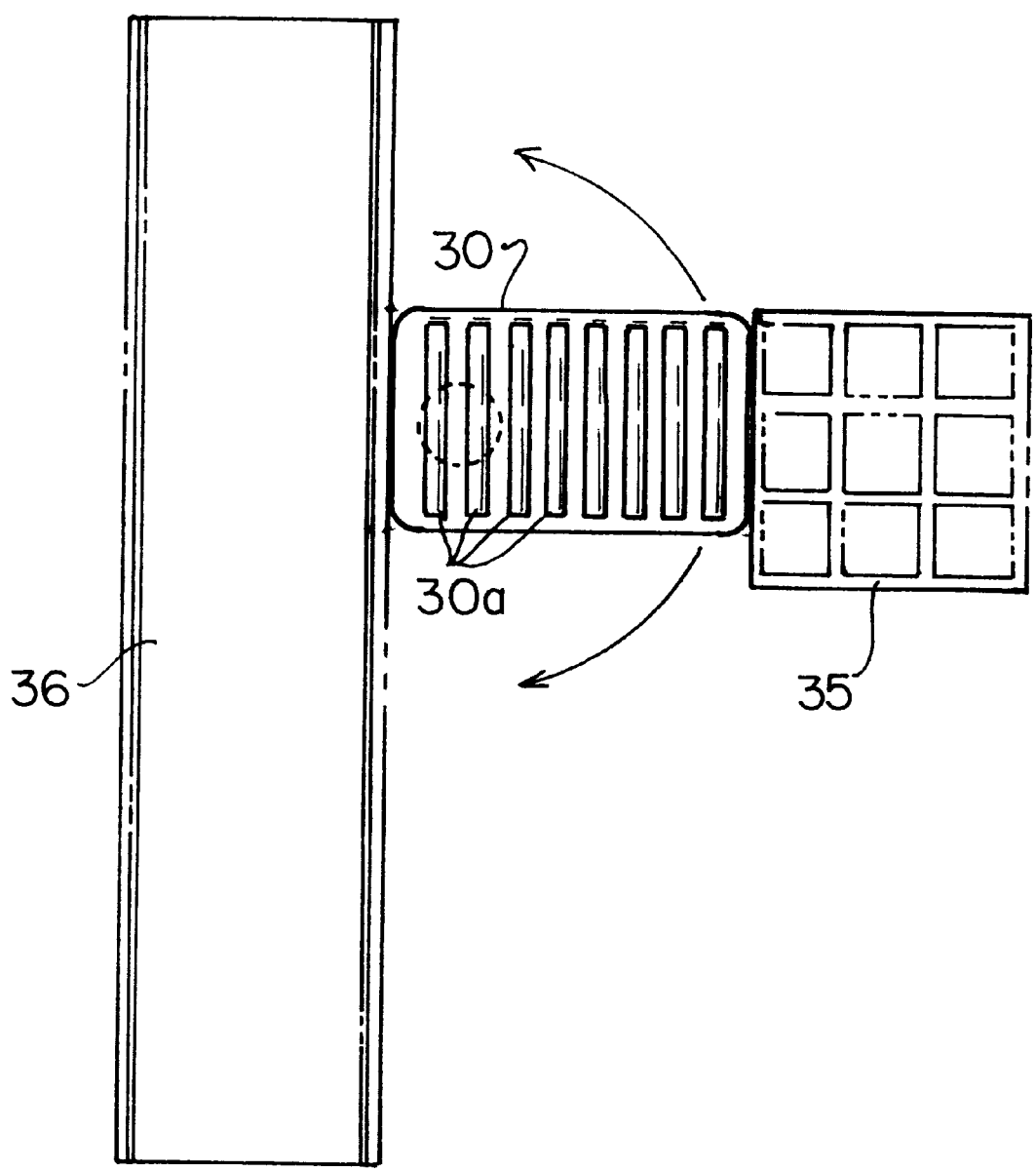
FIG. 6 is a top plan view of the present invention in use with moving articles from one point to another point.

With reference now to the drawings, and in particular to FIGS. 1 through 6 thereof, a new swivelable roller conveyor apparatus embodying the principles and concepts of the present invention and generally designated by the reference numeral 10 will be described.

As best illustrated in FIGS. 1 through 6, the swivelable roller conveyor apparatus 10 generally comprises a base 15 having an upright tubular member 16 having an opening 16B in a top 16A thereof, a spring means being securely mounted to the upright tubular member 16 and having a spring 18. The spring means further includes a spring rotation stop member 18C which is securely mounted to and extending outwardly from the upright tubular member 16 for preventing rotation of the spring 18 about the upright tubular member 16. The spring 18 has ends 18A–B which extend outwardly of upright tubular member 16. The spring rotation stop member 18C is conventionally disposed upon the upright tubular member 16 so as to engage the ends 18A–B of the spring 18. The ends 18A–B of the spring 18 are engageable to opposite sides of the spring rotation stop member 18C with the spring rotation stop member 18C being essentially L-shaped. The spring means further includes a pair of slide prevention retainers 18D which are securely attached to the upright tubular member 16 below the spring 18 for preventing the spring 18 from sliding down the upright tubular member 16. The two slide prevention retainers 18D are essentially pins extending through a side of the upright tubular member 16.

The conveyor apparatus 10 further includes a support means having an elongate support member 20 which is rotatably and removably extended through the top 16A of the upright tubular member 16 and which has a bushing 23 securely and conventionally mounted near a bottom thereof A thrust bearing 22 is securely and conventionally mounted near a top of the elongate support member 20 for allowing rotation thereof inside the upright tubular member 16, and a flange member 21 is securely and conventionally attached near a top of the elongate support member 20 for engaging the spring 18 upon rotation of the elongate support member 20. The support means further includes three retainer members 24A1–A3 which are essentially collars, one of which is securely and conventionally mounted about the elongate support member 20 above the bearing 22 to prevent the bearing 22 from sliding upon the elongate support member 20, and the others of which are securely mounted to the elongate support member 20 above and below the bushing 23 to prevent the bushing 23 from sliding upon the elongate support member 20. The flange member 21 is engageably disposed to one of the ends of the spring 18 which limits rotation of the elongate support member 20 and which returns the elongate support member 20 to its resting position after the elongate support member 20 has been pivoted.

Further, the conveyor apparatus 10 includes a rack 30 having thirteen rollers 30A being rollably mounted thereto and being laterally spaced and aligned in a single plane along a length of the rack 30 and being securely and conventionally mounted near a first end 30C of the rack 30 upon the elongate support member 20. An elongate rack support bracket 40 has a first end 40A connected to the rack 30 near a second end 30B of the rack 30 and has a second end 40B rotatably mounted about the upright tubular member 16. The second end 40B of the elongate rack support member 40 being essentially a sleeve.

In use, a user would position the conveyor apparatus 10 for the purpose of moving articles from one point 35 to another point 36 across the rack 30, and if the user decided to move to the other side of the conveyor apparatus 10, he/she can do so by simply pushing the rack 30 so that it will pivot along with the elongate support member 20 upon the upright tubular member 16 allowing the user through the space occupied by the rack 30 in a resting position. Once to the other side, the spring 18 along with the flange member 21 will urge or return the rack 30 to its original resting position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A swivelable roller conveyor apparatus comprising:
   a base having an uptight tubular member having an opening in a top thereof;
   a spring means being securely mounted to said upright tubular member and having a spring;
   a support means having an elongate support member which is rotatably and removably extended through said top of said upright tubular member and having a bushing securely mounted near a bottom thereof, a bearing securely mounted near a top of said elongate support member for allowing rotation thereof, and a flange member securely attached near a top of said elongate support member for engaging said spring upon rotation of said elongate support member;
   a rack having a plurality of rollers being rollably mounted thereto and being laterally spaced and aligned a single plane along a length of said rack and being securely mounted upon said elongate support member; and
   an elongate rack support bracket having a first end connected to said rack and having a second end rotatably mounted about said upright tubular member.

2. A swivelable roller conveyor apparatus as described in claim 1, wherein said support member further includes a plurality of retainer members, one of which is securely mounted about said elongate support member and above said bearing to prevent said bearing from sliding upon said elongate support member, and the others of which are securely mounted to said elongate support member above and below said bushing to prevent said bushing from sliding upon said elongate support member.

3. A swivelable roller conveyor apparatus as described in claim 1, wherein said second end of said elongate rack support member is essentially a sleeve.

4. A swivelable roller conveyor apparatus as described in claim 1, wherein said spring means further includes at least one slide prevention retainer which is securely attached to said upright tubular member below said spring for preventing the spring from sliding down said upright tubular member.

5. A swivelable roller conveyor apparatus as described in claim 4, wherein said at least one slide prevention retainer is essentially a pin extending through a side of said upright tubular member.

6. A swivelable roller conveyor apparatus as described in claim 1, wherein said spring means includes a spring rotation stop member which is securely mounted to and extending outwardly from said upright tubular member for preventing rotation of said spring about said upright tubular member.

7. A swivelable roller conveyor apparatus as described in claim 2, wherein said spring has ends which extend outwardly of said upright tubular member.

8. A swivelable roller conveyor apparatus as described in claim 7, wherein said flange member is engageably disposed to one of said ends of said spring to limit rotation of said elongate support member and to return said elongate support member to its resting position after having been rotated.

9. A swivelable roller conveyor apparatus as described in claim 6, wherein said spring rotation stop member is disposed upon said upright tubular member so as to engage said ends of said spring.

10. A swivelable roller conveyor apparatus as described in claim 9, wherein said ends of said spring engage opposite sides of said spring rotation stop member.

11. A swivelable roller conveyor apparatus as described in claim 10, wherein said spring rotation stop member is essentially L-shaped.

12. A swivelable roller conveyor apparatus comprising:
    a base having an upright tubular member having an opening in a top thereof;
    a spring means being securely mounted to said upright tubular member and having a spring, said spring means further including a spring rotation stop member which is securely mounted to and extending outwardly from said upright tubular member for preventing rotation of said spring about said upright tubular member, said spring means also including a spring rotation stop member which is securely mounted to and extending outwardly from said upright tubular member for preventing rotation of said spring about said upright tubular member, said spring rotation stop member being disposed upon said upright tubular member so as to engage said ends of said spring, said ends of said spring being engageable to opposite sides of said spring rotation stop member, said spring rotation stop member being essentially L-shaped, said spring having ends which extend outwardly of said upright tubular member, said spring means further including at least one slide prevention retainer which is securely attached to said upright tubular member below said spring for preventing the spring from sliding down said upright tubular member, said at least one slide prevention retainer being essentially a pin extending through a side of said upright tubular member;
    a support means having an elongate support member which is rotatably and removably extended through said top of said upright tubular member and having a bushing securely mounted near a bottom thereof, a bearing securely mounted near a top of said elongate support member for allowing rotation thereof, and a flange member securely attached near a top of said elongate support member for engaging said spring upon rotation of said elongate support member, said support member further including a plurality of retainer members, one of which is securely mounted about said elongate support member and above said bearing to prevent said bearing from sliding upon said elongate support member, and the others of which are securely mounted to said elongate support member above and below said bushing to prevent said bushing from sliding upon said elongate support member, wherein said flange member being engageably disposed to one of said ends of said spring to limit rotation of said elongate support member and to return said elongate support member to its resting position after having been rotated;
    a rack having a plurality of rollers being rollably mounted thereto and being laterally spaced and aligned in a single plane along a length of said rack and being securely mounted upon said elongate support member near a first end of said rack; and
    an elongate rack support bracket having a first end connected to said rack near a second end of said rack and having a second end rotatably mounted about said upright tubular member, said second end of said elongate rack support member being essentially a sleeve.

* * * * *